US008395278B2

(12) United States Patent
Cawthorne et al.

(10) Patent No.: US 8,395,278 B2
(45) Date of Patent: Mar. 12, 2013

(54) METHOD AND APPARATUS FOR STARTING AN INTERNAL COMBUSTION ENGINE

(75) Inventors: William R. Cawthorne, Milford, MI (US); Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 12/851,123

(22) Filed: Aug. 5, 2010

(65) Prior Publication Data

US 2012/0032506 A1 Feb. 9, 2012

(51) Int. Cl.
*B60R 25/04* (2006.01)

(52) U.S. Cl. .................................................... 307/10.3

(58) Field of Classification Search ................. 307/10.6, 307/10.3

See application file for complete search history.

(56) References Cited

U.S. PATENT DOCUMENTS 7,605,494 B2 * 10/2009 Jabaji et al. ................. 307/10.1

* cited by examiner

*Primary Examiner* — Robert L. Deberadinis

(57) ABSTRACT

A starting system for an internal combustion engine includes a starter motor configured to transfer torque to the engine during an engine starting event, a low-voltage power bus including a first bus segment and a second bus segment, a controllable isolation circuit including a first state wherein the first and second bus segments are electrically coupled and a second state wherein the first and second bus segments are electrically isolated, a low-voltage battery and the starter motor electrically coupled to the first bus segment, an accessory power module and a power supply for a control module electrically coupled to the second bus segment; and the control module configured to control the isolation circuit to the second state to electrically isolate the first bus segment from the second bus segment during the engine starting event.

13 Claims, 2 Drawing Sheets

METHOD AND APPARATUS FOR STARTING AN INTERNAL COMBUSTION ENGINE

TECHNICAL FIELD

This disclosure is related to starting systems for internal combustion engines.

BACKGROUND

The statements in this section merely provide background information related to the present disclosure and may not constitute prior art.

Vehicle electrical systems including electric machines, e.g., motors and accessory drive devices that receive electric power from energy storage devices, e.g., batteries, and are controlled by signals originating from control modules and other control devices and logic circuits. One electric circuit includes an electric-powered starter motor that spins an internal combustion engine when activated with an ignition switch. Control modules are electrically powered and functional to operate as intended only when electric power is greater than a minimum operating voltage for integrated circuits and other components thereof, e.g., 5V DC.

During an engine starting event, power draw by a starter motor can cause battery voltage and system voltage to fall below a minimum operating voltage of the integrated circuits of the control modules, thus affecting their ability to function. A known method for maintaining system voltage greater than a minimum operating voltage is to include a boost electric power supply in a control module, resulting in increased control module circuit complexity and associated cost.

In a hybrid vehicle system using an internal combustion engine in conjunction with electric torque machines to generate tractive torque, an auxiliary or accessory power module can be used in place of an alternator/generator to support low-voltage loads and electrically charge a low-voltage battery. The auxiliary power module converts energy from the high-voltage hybrid battery system to low-voltage to support the low-voltage system. A peak power rating for an auxiliary power module configured to provide electric power to a starter motor must be sufficient to operate the starter motor across a wide range of ambient conditions, engine operating conditions and associated electric loads. An auxiliary power module having sufficient electric power capacity to operate a starter motor may not be cost-effective.

SUMMARY

A starting system for an internal combustion engine includes a starter motor configured to transfer torque to the engine during an engine starting event, a low-voltage power bus including a first bus segment and a second bus segment, a controllable isolation circuit including a first state wherein the first and second bus segments are electrically coupled and a second state wherein the first and second bus segments are electrically isolated, a low-voltage battery and the starter motor electrically coupled to the first bus segment, an accessory power module and a power supply for a control module electrically coupled to the second bus segment; and the control module configured to control the isolation circuit to the second state to electrically isolate the first bus segment from the second bus segment during the engine starting event.

BRIEF DESCRIPTION OF THE DRAWINGS

One or more embodiments will now be described, by way of example, with reference to the accompanying drawings, in which.

DETAILED DESCRIPTION

Figure 1:
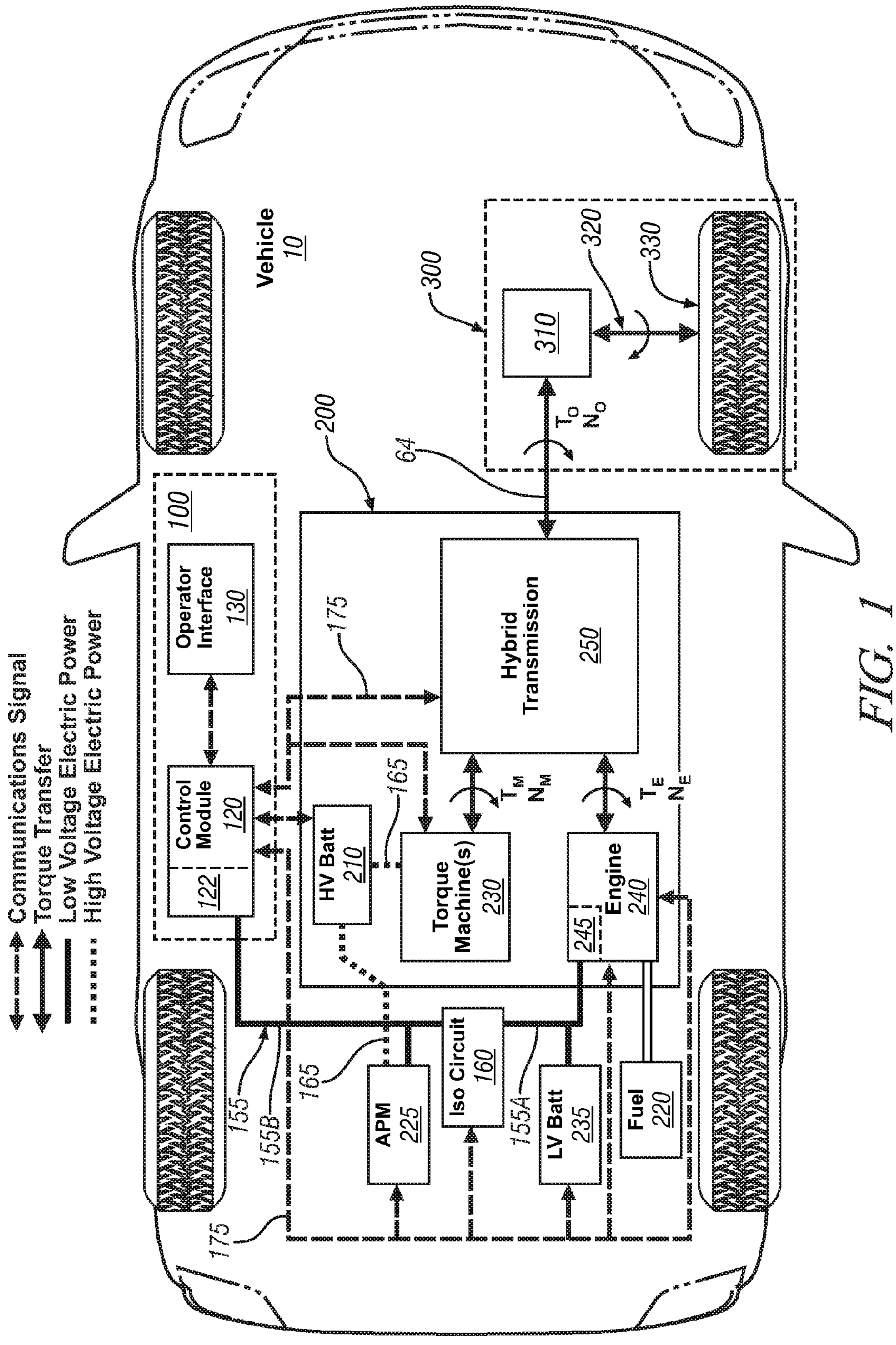
FIG. 1 is a two-dimensional schematic diagram of a vehicle including a control system, a hybrid powertrain system, and a driveline in accordance with the present disclosure.

Referring now to the drawings, wherein the showings are for the purpose of illustrating certain exemplary embodiments only and not for the purpose of limiting the same, FIG. 1 schematically shows a vehicle 10 including a control system 100, a hybrid powertrain system 200, and a driveline 300. Like numerals refer to like elements in the description.

The driveline 300 can include a differential gear device 310 that mechanically couples to an axle 320 or half-shaft that mechanically couples to a wheel 330 in one embodiment. The differential gear device 310 is coupled to an output member 64 of the hybrid powertrain system 200, and transfers output power therebetween. The driveline 300 transfers tractive power between the hybrid powertrain system 200 and a road surface.

The hybrid powertrain system 200 includes an internal combustion engine 240 and torque machine(s) 230 that are mechanically coupled to a hybrid transmission 250. Mechanical power originating in the engine 240 can be transferred to the output member 64 and the torque machine(s) 230 via an input member 12 and using the hybrid transmission 250. Parameters associated with such input power from the engine 240 include input torque $T_E$ and input speed $N_E$. Mechanical power from the torque machine(s) 230 can be transferred to the output member 64 and the engine 240 using the hybrid transmission 250. Parameters associated with such mechanical power transfer include motor torque $T_M$ and motor speed $N_M$. Mechanical power can be transferred between the hybrid transmission 250 and the driveline 300 via the output member 64. Parameters associated with such mechanical power transfer include output torque $T_O$ and output speed $N_O$.

Preferably, the engine 240 is a multi-cylinder internal combustion engine selectively operative in a plurality of states, including one of an engine-on state and an engine-off state, one of an all-cylinder state and a cylinder deactivation state, and one of a fueled state and a fuel cutoff state. In one embodiment, the hybrid transmission 250 is operative in one of a plurality of range states including fixed gear and continuously variable range states through selective activation of one or more torque transfer clutches. In one embodiment, the engine 240 is a spark-ignition engine with timing of combustion controlled by advancing or retarding spark ignition timing. Alternatively, the engine 240 is a compression-ignition engine with timing of combustion controlled by advancing or retarding timing of fuel injection events. It is appreciated that the engine 240 can be configured to operate in other combustion modes.

It is appreciated that the hybrid transmission 250 can be configured and controlled to transfer mechanical power therethrough using one or more differential gear sets and selective activation of one or more torque transfer devices, e.g., clutches, in one embodiment.

The torque machine(s) 230, engine 240 and hybrid transmission 250 each include a plurality of sensing devices for monitoring operation thereof including rotational position sensors, e.g., resolvers, for monitoring rotational position and speed of each of the torque machine(s) 230. The torque machine(s) 230, engine 240 and hybrid transmission 250 include a plurality of actuators for controlling operation thereof. The engine 240 includes a starter motor (Starter) 245. The starter motor 245 is preferably a solenoid-controlled low-voltage electric motor configured to generate rotational torque to spin the engine 240 in response to an activation signal originating from the control system 100.

A high-voltage energy storage device (HV Batt) 210 stores potential energy and is coupled via a high-voltage power bus 165 and controllable power inverter(s) to one or more torque machine(s) 230 to transfer power therebetween. Preferably the high-voltage energy storage device 210 includes an electrical storage device that can include a plurality of electrical cells, ultracapacitors, and other devices configured to store electric energy on-vehicle. The torque machine(s) 230 preferably include multi-phase electric motor/generators configured to convert stored electric energy to mechanical power and convert mechanical power to electric energy that can be stored in the high-voltage battery 210 through the controllable power inverter(s) in response to control signals originating from the control system 100. The engine 240 converts fuel stored in a fuel tank to mechanical power through a combustion process.

The control system 100 includes a control module 120 that is signally connected to an operator interface 130. The control module 120 includes a low-voltage electric power supply 122 to provide regulated low-voltage electric power thereto. The operator interface 130 preferably includes a plurality of human/machine interface devices through which an operator commands operation of the vehicle 10, including an ignition switch, an accelerator pedal, a brake pedal, and a transmission range selector (PRNDL). Although the control module 120 and operator interface 130 are shown as discrete elements, such an illustration is for ease of description. It should be recognized that the functions described as being performed by the control module 120 may be combined into one or more devices, e.g., implemented in software, hardware, and/or application-specific integrated circuitry (ASIC) and ancillary circuits that may be separate and distinct from the control module 120. The control module 120 preferably includes one or more general-purpose digital controllers, each including a microprocessor or central processing unit, storage mediums including read only memory (ROM), random access memory (RAM), electrically programmable read only memory (EPROM), a high speed clock, analog to digital (A/D) and digital to analog (D/A) circuitry, and input/output circuitry and devices (I/O) and appropriate signal conditioning and buffer circuitry. The control module 120 has a set of control algorithms, including resident program instructions and calibrations stored in one of the storage mediums and executed to provide respective functions. The control module 120 is shown signally connected to a communications bus 175 for information transfer. It is appreciated that information transfer to and from the control module 120 can be accomplished by one or more communications paths, including using a direct connection, using a local area network bus and using a serial peripheral interface bus. The algorithms of the control schemes are executed during preset loop cycles such that each algorithm is executed at least once each loop cycle. Algorithms stored in the non-volatile memory devices are executed by the central processing unit to monitor inputs from the sensing devices and execute control and diagnostic routines to control operation of actuators associated with elements of the hybrid powertrain system 200 using calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The control module 120 preferably signally and operatively connects to individual elements of the hybrid powertrain system 200 via the communications bus 175. The control module 120 signally connects to the sensing devices of each of the torque machine(s) 230, the engine 240, and the hybrid transmission 250 to monitor operation and determine parametric states thereof. Monitored states of the engine 240 preferably include engine speed ($N_E$), engine torque ($T_E$) or load, and temperature. Monitored states of the hybrid transmission 250 preferably include rotational speed, and hydraulic pressure at a plurality of locations, from which parametric states including application of specific torque transfer clutches can be determined. Monitored states of the torque machine(s) 230 preferably include speed(s) ($N_M$) and power flow(s), e.g., electric current flow, from which a parametric state for motor torque(s) ($T_M$) output from the torque machine (s) 230 can be determined.

The control module 120 operatively connects to the actuators of each of the torque machine(s) 230, the engine 240, and the hybrid transmission 250 to control operation thereof in accordance with executed control schemes that are stored in the form of algorithms and calibrations. The actuators associated with the torque machine(s) 230 preferably include the controllable power inverter(s). The actuators associated with the engine 240 preferably include the starter motor 245 and other actuators, e.g., fuel injectors, air flow controllers, spark ignition systems, and other known devices associated with controlling engine operation including controlling engine states. The actuators associated with the hybrid transmission 250 include solenoid devices for actuating torque transfer clutches to effect operation in specific range states.

The vehicle 10 includes a low-voltage power bus 155 for transferring low-voltage DC electric power within the vehicle 10. The low-voltage DC electric power has a voltage range of 12-14V DC in one embodiment. The low-voltage power bus 155 includes a first bus segment 155A and a second bus segment 155B, which are selectively coupled via an isolation circuit (Iso Circuit) 160. An accessory power module (APM) 225 and the low-voltage electric power supply 122 electrically connect to the second bus segment 155B. A low-voltage battery device (LV Batt) 235 electrically connects to the first bus segment 155A. The starter motor 245 is configured to electrically connect to the first bus segment 155A to draw electric current from the low-voltage battery 235 to generate rotational torque to spin the engine 240 in response to the aforementioned control signal to start the engine 240 originating from the control system 100.

The accessory power module (APM) 225 electrically connects to the high-voltage energy storage device (HV Batt) 210 via a high-voltage power bus 165. The accessory power module 225 is an electric power converter that steps down a portion of the high-voltage DC electric power available on the high-voltage power bus 165 to low-voltage DC electric power, preferably in the 12-14V DC range, to provide electric power to low-voltage on-vehicle electrically-powered accessories. The accessory power module (APM) 225 electrically connects to the low-voltage electric power supply 122.

Figure 2:
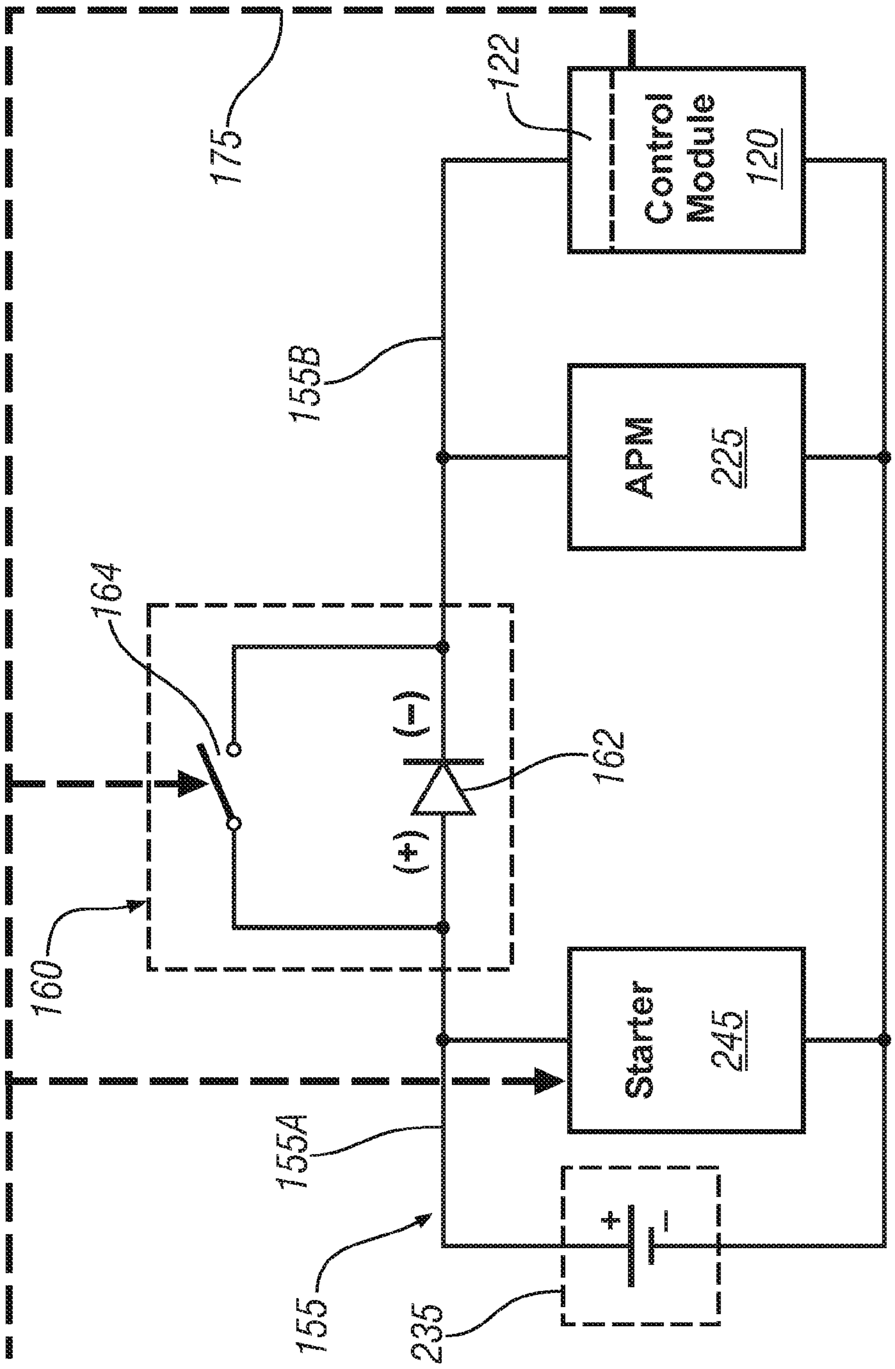
FIG. 2 schematically shows an electrical circuit including a low-voltage power bus including a first bus segment, a second bus segment, and an isolation circuit in accordance with the present disclosure.

FIG. 2 schematically shows an electrical circuit including the low-voltage power bus 155 including the first bus segment 155A and the second bus segment 155B with the isolation circuit 160. The low-voltage power bus 155 electrically connects the low-voltage battery device 235, the starter motor (Starter) 245, and the accessory power module (APM) 225, and transfers electric power to the low-voltage electric power supply 122 of the control module 120. The control module 120 connects to the starter motor 245 and the isolation circuit 160 via the communications bus 175 to control operation thereof.

The isolation circuit 160 includes an isolation switch device 164 wired in parallel with an isolation diode 162 in one embodiment. The isolation circuit 160 is controlled to permit the low-voltage power bus 155 to supply low-voltage electric power from the low-voltage battery device 235 to the second bus segment 155B without active control by the control module 120. The isolation switch device 164 is controllable to one of an open state, as shown, and a closed state, and is preferably operatively controlled by a signal output from the control module 120. In one embodiment, the isolation switch device 164 is an IGBT device. When the isolation switch device 164 is an IGBT device, the IGBT device may include an internal diode that renders the isolation diode 162 redundant and thus is omitted. Alternatively, the isolation switch device 164 is a normally-closed electromechanical relay device that is controlled to an open state by a control signal from the control module 120 to isolate the first bus segment 155A from the second bus segment 155B prior to engaging the starter motor 245 to start the engine 240. It is appreciated that the isolation switch device 164 can include other hardware configurations.

The isolation diode 162 is oriented with a forward bias from the low-voltage battery 235 to the accessory power module 225, including an anode (+) oriented towards the low-voltage battery 235 and a cathode (−) oriented towards the accessory power module 225. When the isolation switch device 164 is in the open state, electric current can flow from the low-voltage battery 235 to the accessory power module 225 via the first bus segment 155A through the isolation diode 162 and the second bus segment 155B. Furthermore, electric current can flow from the low-voltage battery 235 to the starter motor 245, and electric current can flow from the accessory power module 225 to the low-voltage electric power supply 122 of the control module 120 and to other accessories. The presence and operation of the isolation diode 162 prevents electric current from flowing from the second bus segment 155B to the first bus segment 155A, including preventing electric current from flowing from the accessory power module 225 to the low-voltage battery 235 and the starter motor 245 when the isolation switch device 164 is in the open state. When the isolation switch device 164 is in the closed state, electric current can flow in either direction between the first bus segment 155A and the second bus segment 155B. Thus, electric current can flow between the low-voltage battery 235, the starter motor 245, the accessory power module 225, the low-voltage electric power supply 122 of the control module 120 and other accessories.

Operation of the aforementioned system in the hybrid vehicle 10 is described with reference to Table 1.

TABLE 1

| Vehicle State | Ignition Switch | Starter | Engine | Isolation Switch |
|---|---|---|---|---|
| Vehicle Off | OFF | OFF | OFF | OPEN |
| Vehicle Start | OFF -> ON | OFF | OFF | OPEN |
| Engine Start | ON | ON | OFF -> ON | OPEN |
| Engine Run | ON | OFF | ON | CLOSED |

In operation, the control module 120 controls the isolation switch device 164 as follows. When the vehicle is in an off state (Vehicle Off), a vehicle ignition switch is off (OFF) and the isolation switch device 164 is in the open state (OPEN). The low-voltage battery 235 supplies required electric current to the accessory power module 225 and the low-voltage electric power supply 122 of the control module 120 through the low-voltage power bus 155 via the isolation diode 162.

When the operator indicates an intent to operate the vehicle 10 (Vehicle Start), e.g., through a key-on action including transitioning the vehicle ignition switch from off to on (OFF ->ON), the isolation switch device 164 remains in the open state (OPEN). The low-voltage battery 235 supplies required electric current to the accessory power module 225 and the low-voltage electric power supply 122 of the control module 120 through the low-voltage power bus 155 via the isolation diode 162, and the accessory power module 225 is activated to supply electric current to the low-voltage electric power supply 122 of the control module 120 as required. The vehicle 10 operates with the engine 240 in the engine-off state (OFF).

There can be a command to operate the engine 240, which includes starting the engine 240 (Engine Start) and subsequently running the engine 240 (Engine Run). The command to operate the engine 240 may occur in response to an operator torque request or in response to an autostart control signal from the control module 120, e.g., to provide power to increase state-of-charge of the high-voltage battery 210 during ongoing operation of the vehicle 10. The command to operate the engine 240 preferably originates from the control module 120.

Starting the engine 240 (Engine Start) includes activating the starter motor 245 (ON), causing it to draw electric current from low-voltage battery 235 via the low-voltage power bus 155. The isolation switch device 164 remains in the open state (OPEN) during the period of time when the starter motor 245 is activated (ON). The presence of the isolation diode 162 and the isolation switch device 164 in the open state (OPEN) causes all electric current flow to the starter motor 245 to be drawn from the low-voltage battery 235 via the first bus segment 155A. Coincidentally, the accessory power module 225 provides electric power to the low-voltage electric power supply 122 of the control module 120 and any other accessory power demands via the second bus segment 155B. When the isolation switch device 164 is in the open state (OPEN), the first bus segment 155A is electrically separated from the second bus segment 155B, i.e., there are two electrically separated low-voltage DC electric power buses for transferring low-voltage DC electric power within the vehicle 10. Thus, the low-voltage electric power supply 122 of the control module 120 and any other accessory power devices connected to the second bus segment 155B are electrically isolated from transient power voltages resulting from electric current flow to the starter motor 245 associated with starting the engine 240.

When the engine 240 is running (ON) and the starter motor 245 is no longer activated (OFF), the isolation switch device 164 is controlled to the closed state (CLOSED), allowing electric current to flow in either direction between the first bus segment 155A and the second bus segment 155B, bypassing the isolation diode 162.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A starting system for an internal combustion engine, comprising:

a starter motor configured to transfer torque to the engine during an engine starting event;

a low-voltage power bus including a first bus segment and a second bus segment;

a controllable isolation circuit comprising an isolation diode electrically in parallel with an isolation switch, the isolation diode oriented with a forward bias from the first bus segment to the second bus segment permitting flow of electric power from the first bus segment to the second bus segment without active control, the isolation switch operative in a first state wherein the first and second bus segments are electrically coupled and a second state wherein the first and second bus segments are electrically isolated;

a low-voltage battery and the starter motor electrically coupled to the first bus segment;

an accessory power module and a power supply for a control module electrically coupled to the second bus segment; and the control module configured to control the isolation circuit to the second state to electrically isolate the first bus segment from the second bus segment during the engine starting event.

2. The starting system of claim 1, further comprising the control module configured to control the isolation circuit to the first state to electrically couple the first bus segment and the second bus segment subsequent to the engine starting event.

3. The starting system of claim 2, further comprising the control module configured to control the isolation circuit to the first state to electrically connect the first bus segment and the second bus segment only subsequent to the engine starting event.

4. The starting system of claim 1, wherein control of the isolation circuit to the first state comprises control of the isolation switch device to a closed position and control of the isolation circuit to the second state comprises control of the isolation switch device to an open position.

5. The starting system of claim 4, wherein the control module is configured to control the isolation switch device to the closed position only when the engine is running

6. The starting system of claim 5, wherein the accessory power module comprises an electric power converter configured to step down high-voltage DC electric power available from a high-voltage power bus to low-voltage DC electric power, the accessory power module electrically coupled to the second bus segment to transfer the low-voltage DC electric power thereto.

7. The starting system of claim 6, wherein the accessory power module is electrically coupled to the second bus segment to transfer the low-voltage DC electric power thereto and to the first bus segment of the low-voltage power bus only when the isolation switch device is controlled to the closed position.

8. An engine starting system for a hybrid powertrain system including an internal combustion engine, comprising:

a low-voltage power bus including a first bus segment, a second bus segment, and a controllable isolation circuit electrically coupled in series between the first bus segment and the second bus segment;

said controllable isolation circuit comprising an isolation diode electrically in parallel with an isolation switch, the isolation diode oriented with a forward bias from the first bus segment to the second bus segment permitting flow of electric power from the first bus segment to the second bus segment without active control;

a low-voltage battery and a starter motor electrically coupled to the first bus segment;

an accessory power module electrically coupled to the second bus segment; and a control module configured to actuate the starter motor with the low-voltage battery to effect an engine starting event while controlling the isolation circuit to electrically isolate the second bus segment from the first bus segment.

9. The engine starting system of claim 8, wherein controlling the isolation circuit to electrically isolate the second bus segment from the first bus segment comprises controlling the isolation switch device to an open state.

10. The engine starting system of claim 9, wherein the control module is further configured to control the isolation switch device to a closed state to electrically couple the second bus segment to the first bus segment subsequent to the engine starting event during operation of the hybrid powertrain system.

11. The engine starting system of claim 9, wherein the control module is further configured to control the isolation switch device to an open state to electrically isolate the second bus segment from the first bus segment when the internal combustion engine is not running during operation of the hybrid powertrain system.

12. A method for starting an internal combustion engine of a hybrid powertrain system, comprising:

commanding an engine starting event;

operating a starter motor electrically connected to a low-voltage battery configured to transfer torque to the engine in response to the engine starting event and electrically isolating the low-voltage battery and the starter motor from an accessory power module during the commanded engine starting event; and electrically coupling the low-voltage battery to the accessory power module to permit electric current flow from the accessory power module to the low-voltage battery only when the engine is running subsequent to the commanded engine starting event and permit electric current flow from the low-voltage battery to the accessory power module without active control.

13. The method of claim 12, wherein electrically isolating the low-voltage battery and the starter motor from the accessory power module comprises restricting electric current flow from the accessory power module to the starter motor and the low-voltage battery during the commanded engine starting event.

* * * * *